(12) United States Patent
Kim et al.

(10) Patent No.: US 7,947,402 B2
(45) Date of Patent: May 24, 2011

(54) FUEL CELL SYSTEM CAPABLE OF SUPPLYING AND RECEIVING POWER AND METHOD OF OPERATING THE SAME

(75) Inventors: Young-jae Kim, Seoul (KR); Hye-jung Cho, Anyang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 75 days.

(21) Appl. No.: 12/173,850

(22) Filed: Jul. 16, 2008

(65) Prior Publication Data
US 2009/0176132 A1     Jul. 9, 2009

(30) Foreign Application Priority Data
Jan. 4, 2008   (KR) .................. 10-2008-0001425

(51) Int. Cl.
*H01M 8/04*    (2006.01)
*H01R 4/66*    (2006.01)
(52) U.S. Cl. .......................................... 429/429; 439/92
(58) Field of Classification Search ............. 429/12–46, 429/400–535; 439/92
See application file for complete search history.

(56) References Cited

U.S. PATENT DOCUMENTS

| | | | |
|---|---|---|---|
| 6,614,206 B1 * | 9/2003 | Wong et al. | 320/136 |
| 2003/0096517 A1 * | 5/2003 | Ho | 439/79 |
| 2003/0234634 A1 * | 12/2003 | Lee | 323/241 |
| 2005/0058857 A1 * | 3/2005 | Rocke et al. | 429/9 |

\* cited by examiner

*Primary Examiner* — Basia Ridley
*Assistant Examiner* — Jonathan G Leong
(74) *Attorney, Agent, or Firm* — Christie, Parker & Hale, LLP

(57) ABSTRACT

Provided is a fuel cell system including: a cartridge in which fuel is stored; a power unit producing power by using the fuel supplied from the cartridge; and a port to which an electronic device is connected, wherein the port comprises: a first channel which is a channel for receiving start-up power from the electronic device and supplying produced power to the electronic device; a second channel via which a signal indicating attachment of the fuel cell system to the electronic device is transmitted to the electronic device when the fuel cell system is attached to the electronic device; and a third channel for grounding.

7 Claims, 2 Drawing Sheets

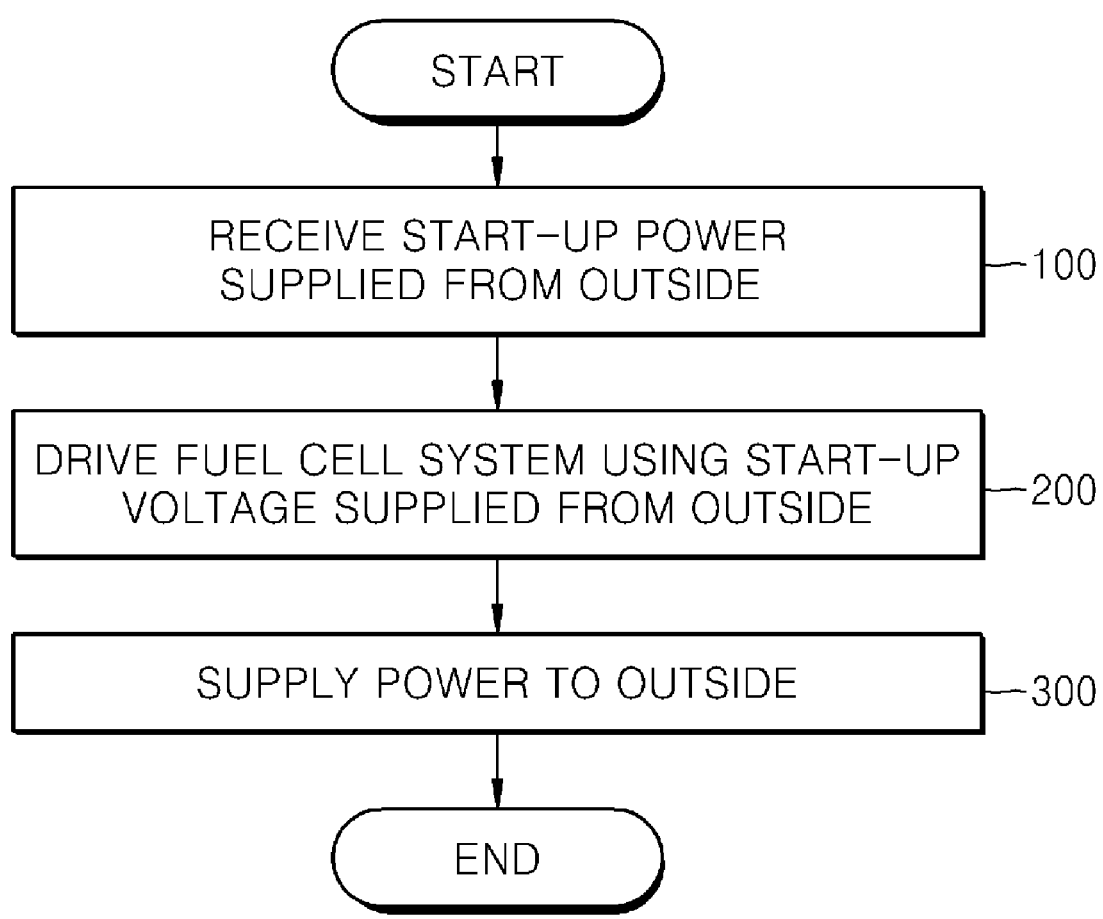

FUEL CELL SYSTEM CAPABLE OF SUPPLYING AND RECEIVING POWER AND METHOD OF OPERATING THE SAME

CROSS-REFERENCE TO RELATED PATENT APPLICATION

This application claims the benefit of Korean Patent Application No. 10-2008-0001425, filed on Jan. 4, 2008 in the Korean Intellectual Property Office, the disclosure of which is incorporated herein in its entirety by reference.

BACKGROUND OF THE INVENTION

1. Field of the Invention

The present invention relates to a fuel cell system and a method of operating the same.

2. Description of the Related Art

Secondary electric cells, that is, batteries, are widely used as power supply sources for laptop computers, personal digital assistants (PDAs), portable display devices, mobile phones, etc.

As the variety of portable electronic devices increases, various batteries for each kind of electronic device are being introduced.

However, the batteries currently used for portable electronic devices do not provide power for as long as the user desires. In particular, when the portable electronic devices are operated continuously, the time the batteries can be used may further decrease. Also, in the case of currently used batteries, it takes a lot of time to completely charge the batteries, and the performance of the batteries may be degraded as the batteries are charged and discharged frequently.

Accordingly, new power sources have been developed, and one of these is a fuel cell system.

A fuel cell system can be formed of a cartridge, in which fuel such as methanol is stored, and a power unit produces power by using the fuel supplied from the cartridge.

The fuel cell system can produce power continuously as long as fuel is supplied. Thus power can be produced as long as the user wants. Also, if the fuel runs out, power can be produced again by replacing the cartridge or supplying fuel to the cartridge. Accordingly, in the fuel cell system, the time required for producing power again is significantly shorter than a charging time of a battery.

SUMMARY OF THE INVENTION

The present invention provides a fuel cell system capable of supplying start-up power from the outside.

The present invention also provides a method of operating the fuel cell system.

According to an aspect of the present invention, there is provided a fuel cell system comprising: a cartridge in which fuel is stored; a power unit producing power by using the fuel supplied from the cartridge; and a port to which an electronic device is connected, wherein the port comprises: a first channel which is a channel for receiving start-up power from the electronic device and supplying produced power to the electronic device; a second channel via which a signal indicating attachment of the fuel cell system to the electronic device is transmitted to the electronic device when the fuel cell system is attached to the electronic device; and a third channel for grounding.

The power unit may comprise a system control unit, a balance of plant (BOP) and a driver, a fuel cell, and a direct current-direct current (DC-DC) converter. The fuel cell system may further comprise a short prevention unit between the DC-DC converter and the first channel. The port may be protruded from or is recessed into a surface of a case of the fuel cell system. A coupling unit for coupling the fuel cell system to the electronic device may be formed around the port.

According to another aspect of the present invention, there is provided a method of operating the fuel cell system comprising: a cartridge in which fuel is stored; a power unit producing power by using the fuel supplied from the cartridge; and a port to which an electronic device is connected, wherein the port comprises: a first channel which is a channel for receiving start-up power from the electronic device and supplying produced power to the electronic device; a second channel via which a signal indicating attachment of the fuel cell system to the electronic device is transmitted to the electronic device when the fuel cell system is attached to the electronic device; and a third channel for grounding, the method comprising: informing the electronic device through the second channel that the fuel cell system is connected to the electronic device; receiving start-up power from the electronic device through the first channel; and driving the fuel cell system using the supplied start-up power.

The driving of the fuel cell system using the supplied start-up power may comprise applying a driving signal to the BOP and the driver using the supplied start-up power.

BRIEF DESCRIPTION OF THE DRAWINGS

The above and other features and advantages of the present invention will become more apparent by describing in detail exemplary embodiments thereof with reference to the attached drawings in which:

FIG. 3 is a flowchart showing a method of operating the fuel cell system of FIG. 2.

DETAILED DESCRIPTION OF THE INVENTION

Figure 1:
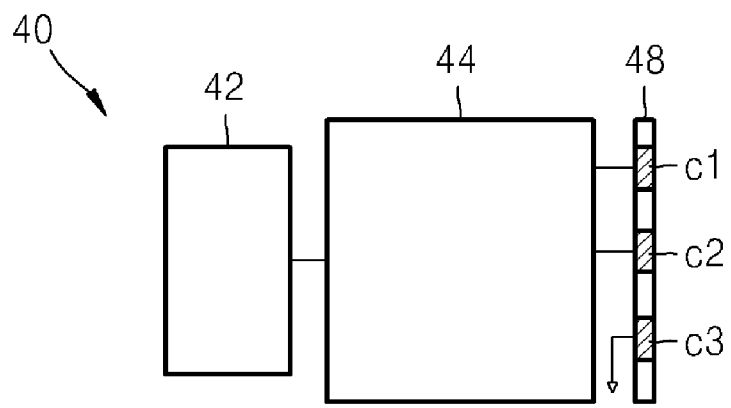
FIG. 1 is a schematic plan view of a fuel cell system according to an embodiment of the present invention.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments will now be described more fully with reference to the accompanying drawings. In the drawings, the thicknesses of layers and regions may be exaggerated for clarity.

A fuel cell system according to at least one embodiment of the present invention will be described with reference to FIG. 1.

FIG. 1 illustrates a fuel cell system 40 according to an embodiment of the present invention.

Referring to FIG. 1, the fuel cell system 40 includes a cartridge 42, a power unit 44, and a port 48 providing a power interface. Fuel to be supplied to the power unit 44 is stored in the cartridge 42. The fuel is used to supply oxygen to an anode of a fuel cell included in the power unit 44. For example, the fuel may be methanol. When the fuel is methanol, the density of the methanol may be adjusted. The cartridge 42 may be a pressurization type or a non-pressurization type. Also, in order to be coupled to each other, the cartridge 42 and the power unit 44 include a coupling unit for coupling, respectively.

According to another embodiment of the present invention, the cartridge 42 may be permanently connected to the power unit 44, and a fuel inlet hole may be formed in another portion of the cartridge 42. Fuel can be filled into the cartridge 42 through the fuel inlet hole.

The power unit 44 includes the fuel cell that produces power by using fuel supplied from the cartridge 42. The power unit 44 may include a fuel transferring line transferring fuel to the fuel cell from the cartridge 42, for example, a balance of plant (BOP) and a driver. Also, the power unit 44 may generate a control signal controlling the amount of fuel supplied to the fuel cell according to the state of the fuel cell. Also, when the fuel cell system 40 is connected to a load, a fuel cell managing unit, that is, a system control unit, generating a signal (hereinafter, a first signal), may be formed in the power unit 44 in order to inform the power unit 44 that the fuel cell system 40 is connected to the load. Also, the power unit 44 may include a power matching unit that matches the level of the power output from the fuel cell to a power level appropriate for the load. An example of the power matching unit may be a direct current-direct current (DC-DC) converter. The load may be one of various portable electronic devices such as a laptop computer, a personal digital assistant (PDA), a portable display device, etc. The port 48 may include first through third channels c1 to c3. Power generated by the power unit 44 is supplied to the load through the first channel c1. Also, power for starting up the fuel cell system is supplied from the load to the power unit 44 through the first channel c1. The first signal is transmitted to the load through the second channel c2. The third channel c3 is a power grounding channel. When the fuel cell system 40 is connected to the load, the third channel c3 can be connected to a grounding terminal at the load. The arrangement of the first through third channels c1 to c3 in the port 48 may vary. For example, the channels may be arranged in the order of the first, third, and second channels c1, c3, and c2.

Figure 2:
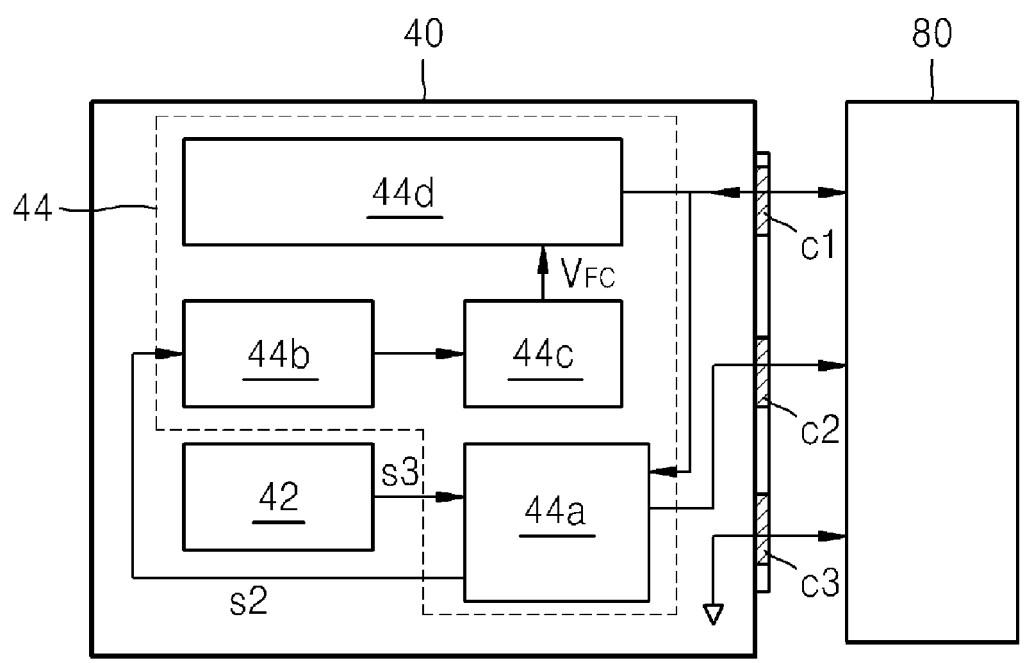
FIG. 2 is a detailed plan view of the fuel cell system of FIG. 1.

FIG. 2 illustrates the fuel cell system 40 having the structure of FIG. 1, according to an embodiment of the present invention.

Referring to FIG. 2, the power unit 44 includes a system control unit 44a, a balance of plant (BOP) and a driver 44b, a fuel cell 44c, and a DC-DC converter 44d. The fuel cell 44c may be a stack type or a planar type.

Hereinafter, the operation of the fuel cell system 40 of FIG. 2 will be described.

When the fuel cell system 40 is connected to a load 80, a first signal s1 is transmitted from the system control unit 44a to the load 80 through the second channel c2. The load 80 can recognize through the first signal s1 that the fuel cell system 40 is connected to the load 80. The first signal s1 may be an electric signal, for example, a pulse signal, which is generated as the second channel c2 is connected to a corresponding portion of the load 80 or as the second channel c2 is physically or mechanically attached to the load 80. When the load 80 has recognized that the fuel cell system 40 is connected thereto, the load 80 applies start-up power to the system control unit 44a through the first channel c1 for a predetermined period of time. The time for applying start-up power may vary according to the state of power source included in the load 80. For example, when the power source of the load 80 is sufficient to supply the start-up power, the load 80 can supply start-up power to the fuel cell system 40 until power needed for driving the load 80 is produced in the fuel cell system 40.

When the start-up power is applied to the system control unit 44a, the system control unit 44a applies a second signal s2 to the BOP and the driver 44b using the start-up power. The second signal s2 is a driving control signal. The BOP and the driver 44b are driven by the second signal s2 and thus fuel and air are supplied to the fuel cell 44c. Thus, power is produced due to a chemical reaction in the fuel cell 44c, and the produced power ($V_{FC}$) is transferred to the DC-DC converter 44d. The DC-DC converter supplies the transferred power ($V_{FC}$) to the load 80 through the first channel c1.

Meanwhile, a third signal s3 which has information on the amount of fuel contained in the cartridge 42 may be transmitted to the system control unit 44a continuously in real time or periodically. The system control unit 44a applies the second signal s2 to the BOP and the driver 44b based on the information obtained through the third signal s3, thereby controlling the amount of fuel supplied from the BOP and the driver 44b to the fuel cell 44c.

As described above, the operation of the fuel cell system starts from the start-up power supplied from the load 80, and thus the fuel cell system does not have to include an additional power source for the starting up operation, for example, a conventional lithium ion battery. Accordingly, the volume and weight of the fuel cell system according to at least one embodiment of the present invention can be reduced.

The operation of the above-described fuel cell system of FIG. 2 may be included in the operation method of the fuel cell system as illustrated in FIG. 3.

Referring to FIG. 3, the method of operating the fuel cell system 40 according to at least one embodiment of the present invention includes receiving start-up power from the outside (operation 100), driving the fuel cell system by using the supplied start-up power (operation 200), and supplying power to the outside (operation 300).

In operation 100, start-up power is supplied from the load 80, to which the fuel cell system 40 is connected, to the system control unit 44a. The time for supplying start-up power may vary according to the state of the basic battery connected to the load 80, as described above. A signal informing that the fuel cell system 40 is connected may be applied to the load 80 before operation 100. The start-up power may be applied thereafter.

In operation 200, the BOP and the driver 44b are driven using the start-up power, thereby supplying fuel and air to the fuel cell 44c including a plurality of unit cells.

In operation 300, power is produced in the fuel cell 44c, and the produced power is supplied to the load 80 through the DC-DC converter 44d and the first channel c1.

During the operation of the fuel cell system 40, the system control unit 44a checks the amount of remaining fuel contained in the cartridge 42 and checks the condition of the fuel cell 44c, for example, the temperature of the fuel cell 44c, the output power of the fuel cell 44c, etc., and thus can control the operation of the fuel cell system 40 according to the result of checking the condition.

While the present invention has been particularly shown and described with reference to exemplary embodiments thereof, the exemplary embodiments should be considered in a descriptive sense only and not for purposes of limitation. For example, it will be understood by those of ordinary skill in the art that the shape or the coupling form of the port 48 may be changed from that described in relation to FIG. 2, while maintaining the structure of the port 48. For example, the port 48 may be formed to simply contact the load 80, and an additional coupling unit may be formed around the port 48. Also, a short circuit prevention unit may be formed between the first channel c1 and the DC-DC converter 44d. In addition, the port 48 may be protruded from or recessed into a surface of a case of the fuel cell system. Therefore, the scope of the invention is defined not by the detailed description of the invention but by the appended claims.

What is claimed is:

1. A fuel cell system configured to receive a cartridge containing fuel, the fuel cell system comprising:
    a power unit comprising a fuel cell for producing power from the fuel supplied from the cartridge, the power unit being configured to receive start-up power from an electronic device which receives the power produced by the fuel cell; and
    a port configured to couple to the electronic device,
    wherein the port comprises:
        a first channel for receiving the start-up power from the electronic device and for supplying the produced power to the electronic device;
        a second channel for transmitting a signal indicating attachment of the fuel cell system to the electronic device to the electronic device when the fuel cell system is attached to the electronic device; and
        a third channel for grounding the electronic device,
    wherein the fuel cell system is configured to receive the start-up power from the electronic device via the first channel, and is configured to use the start-up power to supply the fuel and air to the fuel cell.

2. The fuel cell system of claim 1, wherein the power unit further comprises a system control unit, a balance of plant (BOP) and a driver, and a direct current-direct current (DC-DC) converter.

3. The fuel cell system of claim 2, further comprising a short prevention unit between the DC-DC converter and the first channel.

4. The fuel cell system of claim 1, wherein the port is protruded from or is recessed into a surface of a case of the fuel cell system.

5. The fuel cell system of claim 1, wherein a coupling unit to couple the fuel cell system to the electronic device is formed around the port.

6. A method of operating the fuel cell system of claim 1, the method comprising:
    informing the electronic device through the second channel that the fuel cell system is connected to the electronic device;
    receiving the start-up power from the electronic device through the first channel; and
    driving the fuel cell system by using the supplied start-up power to supply the fuel and the air to the fuel cell.

7. The method of claim 6, wherein the driving of the fuel cell system using the supplied start-up power comprises applying a driving signal to a balance of plant (BOP) and a driver using the supplied start-up power.

* * * * *